United States Patent

Koch

[11] Patent Number: 6,048,304
[45] Date of Patent: Apr. 11, 2000

[54] PROCESS FOR CONTROLLING THE OPERATING PARAMETERS OF AN INCUBATOR

[75] Inventor: Jochim Koch, Ratzeburg, Germany

[73] Assignee: Drager Medizintechnik GmbH, Germany

[21] Appl. No.: 09/152,427

[22] Filed: Sep. 14, 1998

[30] Foreign Application Priority Data

Apr. 23, 1998 [DE] Germany ............ 198 18 170

[51] Int. Cl.$^7$ .............................................. A61G 11/00
[52] U.S. Cl. ............................................................ 600/22
[58] Field of Search ........................ 600/21, 22; 237/3, 237/14

[56] References Cited

U.S. PATENT DOCUMENTS

| | | |
|---|---|---|
| 4,034,740 | 7/1977 | Atherton et al. |
| 5,797,833 | 8/1998 | Kobayashi et al. .................. 600/22 |
| 5,897,485 | 4/1999 | Koch ....................................... 600/22 |
| 5,935,055 | 8/1999 | Koch et al. ............................. 600/22 |

FOREIGN PATENT DOCUMENTS 39 30 363 C2   3/1991   Germany.

*Primary Examiner*—Max Hindenburg
*Attorney, Agent, or Firm*—McGlew and Tuttle, P.C.

[57] ABSTRACT

The present invention pertains to an improved process for controlling the operating parameters of an incubator, which determine the heat balance of a patient, by means of skin temperatures ($t_{h1}$, $t_{h2}$) measured at the patient and the air temperature ($t_i$) measured in the incubator, characterized in that the air temperature ($t_i$) in the incubator is set as a function of the core temperature ($t_c$) and the peripheral temperature ($t_p$), which are determined from the equation $$t_c = t_{h1} + c' \cdot (t_{h1} - t_i) \text{ or}$$

$$t_p = t_{h2} + c' \cdot (t_{h2} - t_i)$$

with the constant c', or as a function of a linkage of the two temperatures, wherein the skin temperature ($t_{h1}$) is measured in a skin area at the head, and the skin temperature ($t_{h2}$) is measured in a skin area on the periphery of the body.

17 Claims, 2 Drawing Sheets

PROCESS FOR CONTROLLING THE OPERATING PARAMETERS OF AN INCUBATOR

FIELD OF THE INVENTION

The present invention pertains to a process for controlling the operating parameters of an incubator which determine the heat balance of a patient by means of the measured values of the skin temperature ($t_{h1}$, $t_{h2}$) measured at the patient and the air temperature ($t_i$) measured in the incubator.

BACKGROUND OF THE INVENTION

Such processes are used to condition the patients in terms of their heat states and optionally also their humidity states in devices used for thermotherapy, especially in incubators for premature and full-term newborn babies. To do so, body temperatures are measured and corresponding conditioning means, especially heating means, are actuated depending on the result.

A process of this class is described in DE 39 30 363 C2, wherein sensors, which are in connection with the body or with the ambient atmosphere for determining the actual values of the state and whose output values are sent to a data processing unit and these values are processed by the said data processing unit into correcting variables for influencing the operating parameters, are provided for controlling the operating parameters that determine the heat balance of a patient introduced into an incubator. It has also been known from the process of this class that at least two of four temperature sensors are provided for different body temperature zones, and the output values of these sensors are sent to the data processing unit and are compared with preset values there, so that a heating means is actuated in the incubator in the case of deviations in order to reach the desired temperature.

Thermotherapy devices, especially incubators, have hitherto been used in practice, which compare only one measured skin temperature with a set point and use the result directly as a controlled variable.

It has been known from clinical studies that two true body temperatures, namely, the core temperature and the peripheral temperature, are important for evaluating the state and the heat balance of a patient.

For example, undercooling can be recognized in the case of highly premature or full-term newborn babies already from an intense cooling of the periphery, while the core of the body is still in the normal range. The body attempts to maintain the core temperature by throttling the blood flow to the periphery, thus reducing the heat loss to the environment there.

Similarly, an increasing fever can be recognized from a decrease in the peripheral temperature with rising core temperature of the body. The body has centralized the blood flow to the core in this case in order to heat it to a higher temperature, and it throttles the blood flow to the periphery in order to save heat and to use it to heat the central organs.

A subsiding fever is recognized from a high core temperature of the body with a simultaneously high peripheral temperature. The body uses the large body surfaces of the periphery to cool the core of the body by a corresponding release of heat.

One drawback of all the prior-art processes for controlling incubators follows from the fact that the temperatures measured at the patient are measured on the skin surface and are therefore distorted by external effects, e.g., especially air flows, so that the operating conditions of the incubator are also set only incorrectly by means of incorrectly determined correcting variables.

SUMMARY AND OBJECTS OF THE INVENTION

The object of the present invention is to improve a process of the type described in the introduction such that the true core temperature or the true peripheral temperature can be determined as a function of the skin temperature measured by means of at least one skin temperature measured in a defined skin area and of the air temperature in the incubator, which is likewise measured, and the air temperature in the incubator can be subsequently set.

According to the invention, a process for controlling the operating parameters of an incubator is provided which determine the heat balance of a patient by means of the measured values of the skin temperature ($t_{h1}$) measured at the patient and the air temperature ($t_i$) measured in the incubator. The air temperature ($t_i$) in the incubator is set as a function of the core temperature ($t_c$) determined from the equation: $t_c = t_{h1} + c' \cdot (t_{h1} - t_i)$ with the constant c', wherein the skin temperature ($t_{h1}$) is measured in a skin area at the head—a determined core temperature.

According to another aspect of the invention, a process for controlling the operating parameters of an incubator is provided which determines the heat balance of a patient, by means of the measured values of the skin temperature ($t_{h2}$) measured at the patient and the air temperature ($t_i$) measured in the incubator. The air temperature ($t_i$) in the incubator is set as a function of the peripheral temperature ($t_p$) determined from the equation $t_p = t_{h2} + c' \cdot (t_{h2} - t_i)$ with the constant c', wherein the skin temperature ($t_{h2}$) is measured in a skin area on the periphery—a determined peripheral temperature.

According to another feature of the invention, a device is provided for carrying out the process above. The device includes an incubator with one or two temperature sensors for measuring the skin temperature ($t_{h1}$, $t_{h2}$) of a patient in a first and/or second skin area as well as with an additional temperature sensor for measuring the air temperature ($t_i$) in the incubator. A central evaluating and control unit is connected to the temperature sensors for processing the measured temperature values. Final control elements are connected to the evaluating and control unit, comprising especially a heating means with a fan and preferably additionally an air humidifier.

It was surprisingly confirmed by model calculations and model experiments that there is a linear relationship between the skin temperature measured at the patient in a defined skin area, the air temperature measured in the incubator, and the core or peripheral temperature of the patient.

From this follows an essential advantage for the patient, namely, that despite the maintenance of the problem-free measurement of the skin temperature with usual temperature sensors, the exact core and peripheral temperatures of the patient can be determined from this in a simple manner and the air temperature in the incubator can be adjusted via suitable final control elements after comparison with set points. Invasive temperature measurements are avoided. The temperature measurement and the temperature control for the patient in the incubator, which is based on this, is performed by means of two noninvasive temperature sensors. One of the temperature sensors is placed at the head, preferably at the forehead of the patient, and it indicates a temperature representative of the brain and consequently of the core of the body, which must be corrected by linear linkage with the air temperature measured in the incubator in order to determine the true core temperature.

As an alternative, the temperature control may be performed according to the second aspect of the invention by measuring the skin temperature on the periphery of the body, especially at the foot or the sole by means of a temperature sensor. The true peripheral temperature is also determined by calculation by a linear linkage with the air temperature measured in the incubator, corresponding to the equation noted above.

In both cases of skin temperature measurement, it is possible to determine by a logical plausibility comparison whether the temperature sensor in question is connected to the ambient temperature, i.e., whether it is detached from or in a thermally conductive connection with skin. Based on the results, it is possible to decide whether or not the compensation of the ambient effect shall become active.

The constant c' in the equations above is determined by the assumed convective heat transmission based on the assumed air flow of 8 cm/sec in the incubator, by the heat conduction and the geometric conditions of the body parts that determine the heat conduction.

One exemplary embodiment of the present invention will be explained on the basis of the only schematic figure.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
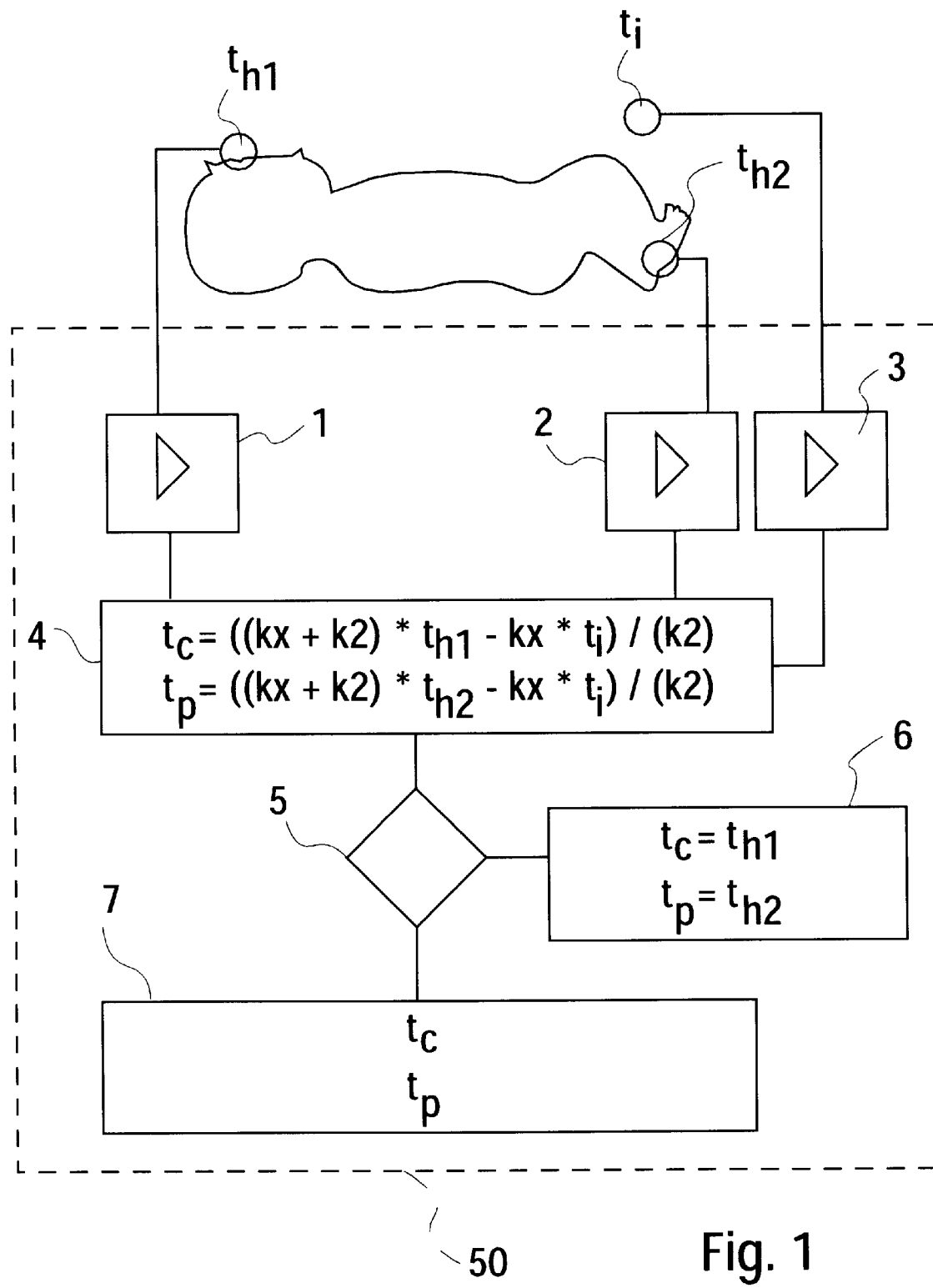
FIG. 1 is a schematic view showing principles of the invention.

Referring to the drawings in particular, the skin temperatures $t_{h1}$ and/or $t_{h2}$ of a premature or full-term newborn baby in an incubator, not shown, are measured. The temperature sensor measuring the skin temperature $t_{h1}$ is preferably arranged at the forehead, and the temperature sensor measuring the skin temperature $t_{h2}$ is preferably arranged at the foot in order to thus measure the peripheral temperature, superimposed by interferences to be compensated, while the core temperature, to which interferences to be compensated are likewise superimposed, is determined at the forehead.

In addition, the air temperature ($t_{i1}$) in the incubator is measured with an additional temperature sensor.

A central evaluating and control unit 50 is connected to the temperature sensors for processing the measured temperature values, and with final control elements connected to the evaluating and control unit, comprising especially a heating means with a fan and preferably additionally an air humidifier. The three temperature sensor signals are transformed into digital values in the measuring bridges with integrated analog-digital converters 1, 2, 3. The true core temperature and/or the true peripheral temperature are determined in a part 4 of a central evaluating and control unit by means of the detailed equations for $t_c$ and $t_p$ given. The constants k2 and kx are determined empirically from the variables indicated as follows, and they give the constant c' with $$c' = \frac{kx}{k2}$$

wherein:

alpha=convective heat transmission at 8 cm/sec lambda i=heat conduction through the insulation of the temperature sensors lambda h=heat conduction of skin lambda k=heat conduction of bone lambda b=heat conduction of blood si=wall thickness of the insulation of the temperature sensor sh=wall thickness of skin sk=wall thickness of bone sb=distance between the well perfused organ and bone Thus, the following heat conduction values are obtained for kx=1/(1/alpha+si/lambda i)

k2=1/(sh/lambda h+sk/lambda k+sh/lambda b).

The plausibility of the measured and calculated values is determined in a comparator 5, which is also part of the central evaluating and control unit.

If, e.g., the temperature sensor for the skin temperature $t_{h2}$ is uncoupled from the ambient air by an insulating cover, the temperature sensor would measure a temperature very close to the core temperature. The compensation corresponding to the second equation in the figure would now indicate a "true" peripheral temperature that is higher than the core temperature. The comparator 5 would equate in this case the peripheral temperature $t_p$ with the measured skin temperature $t_{h1}$, as is described under at function block 6.

If, on the other hand, the calculated "true" core temperature $t_c$ is below the measured skin temperature $t_{h1}$, $t_p$ is equated with the calculated peripheral temperature from the second equation in function block 4. The results for $t_p$ and/or $t_c$ are displayed in the display unit 7 or the results for $t_p$ and/or $t_c$ are used directly for controlling a heating means with a fan after comparison with preset set values and preferably additionally also for controlling an air humidifier in the incubator (see FIG. 2). The relative humidity in the incubator may be set by means of an air humidifier as a function of the air temperature ($t_i$) in the incubator, the core temperature ($t_c$) and/or the peripheral temperature ($t_p$). The air temperature ($t_i$) in the incubator is preferably set by means of a heating means with a fan.

Figure 2:
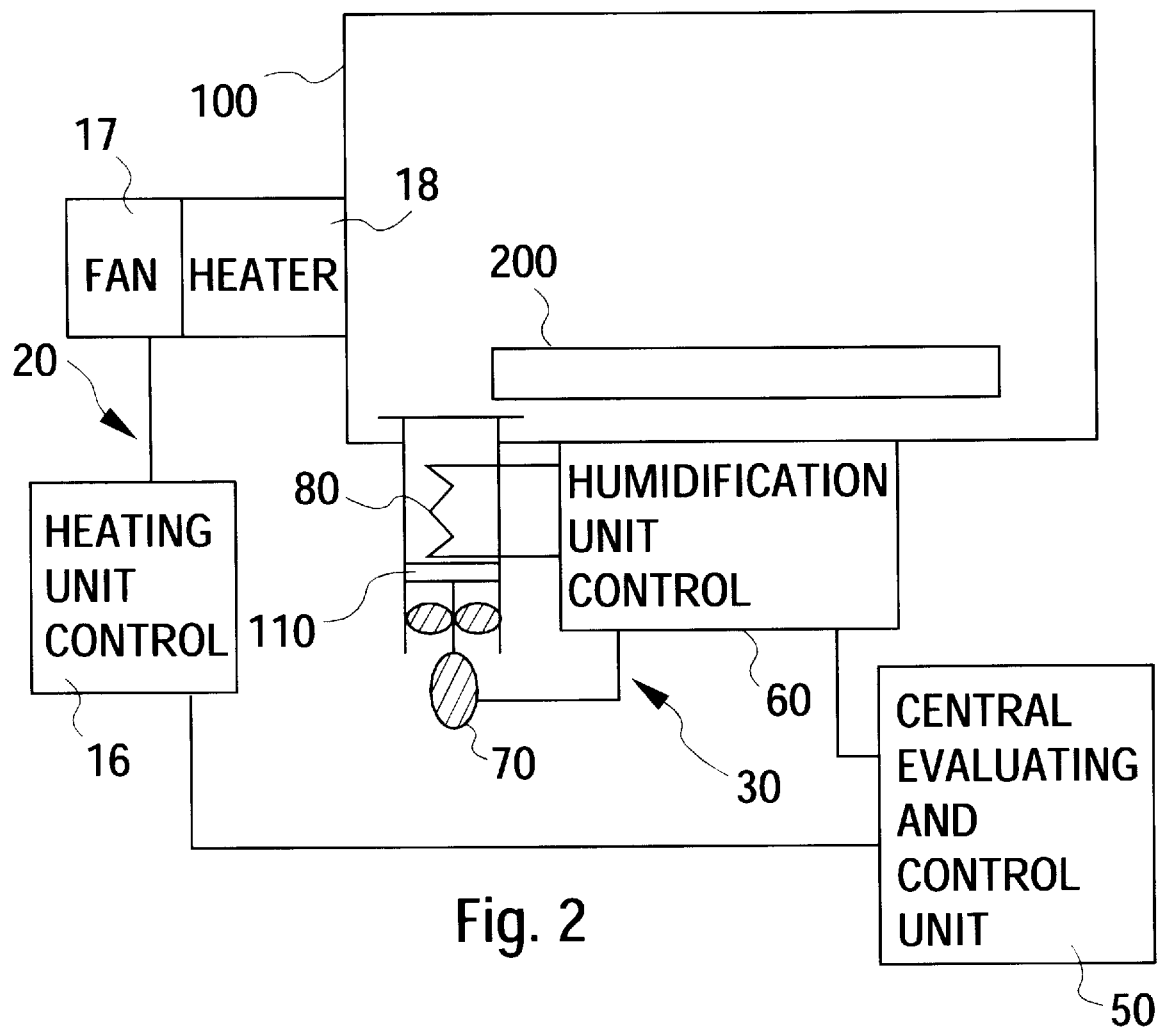
FIG. 2 is a schematic view showing the connection between a central evaluating and control unit and final control elements.

FIG. 2 shows the incubator 100 with an infant lying surface 200. Connected to or associated with the incubator 100 is a heating unit generally designated 20 and a humidification unit generally designated 30. The heating unit 20 and the humidification unit 30 are connected to the central evaluating and control unit 50. The heating unit 20 includes a heating unit control 16, a fan 17 and a heater 18. The humidification unit 30 includes a fan (and motor) 70, a heater 80 and with the air humidifier 110 and a humidification control 60.

While a specific embodiment of the invention has been shown and described in detail to illustrate the application of the principles of the invention, it will be understood that the invention may be embodied otherwise without departing from such principles.

What is claimed is:

1. A process for controlling the operating parameters of an incubator, the process comprising the steps of:
   determining a heat balance of a patient by measuring values of the skin temperature ($t_{h1}$, $t_{h2}$) at the patient and measuring values of the air temperature ($t_i$) measured in the incubator; and
   setting the air temperature ($t_i$) in the incubator as a function of one of the core temperature ($t_c$) and the peripheral temperature ($t_p$) wherein
      the core temperature ($t_c$) is determined from the equation $t_c = t_{h1} + c' \cdot (t_{h1} - t_i)$ with c' being a constant, wherein the skin temperature ($t_{h1}$) is measured in a skin area at the head of the patient and
      the peripheral temperature ($t_p$) is determined from the equation $t_p = t_{h2} + c' \cdot (t_{h2} - t_i)$ with the constant c', wherein the skin temperature ($t_{h2}$) is measured in a skin area on the periphery of the patient.

2. The process in accordance with claim 1, wherein the air temperature ($t_i$) in the incubator is set as a function of the core temperature ($t_c$) determined and the peripheral temperature ($t_p$) determined.

3. The process in accordance with claim 2, wherein the air temperature ($t_i$) in the incubator is set as a linear function of the difference tc–tp.

4. The process in accordance with claim 1, wherein the relative humidity in the incubator is set by means of an air humidifier as a function of the air temperature ($t_i$) in the incubator, the core temperature ($t_c$) and/or the peripheral temperature ($t_p$).

5. The process in accordance with claim 1, wherein the skin temperature ($t_{h1}$) is measured at the forehead.

6. The process in accordance with claim 1 wherein the skin temperature (th2) measured at the extremities, especially at the foot.

7. The process in accordance with claim 1, the air temperature ($t_i$) in the incubator is set by means of a heating means with a fan.

8. The process in accordance with claim 1, wherein the measured temperatures ($t_{h1}$, $th_{h2}$, $t_i$) are processed in a central evaluating and control unit and the control signals determined are subsequently sent to the final control elements determining the operating parameters of the incubator, especially to the heating means with a fan and/or to the air humidifier.

9. A device for determining a heat balance of a patient, the device comprising:
   an incubator with one or two temperature sensors for measuring the skin temperature ($t_{h1}$, $t_{h2}$) of a patient in a first and/or second skin area as well as with an additional temperature sensor for measuring the air temperature ($t_i$) in the incubator;
   an evaluating and control unit connected to the temperature sensors for processing the measured temperature values, and with final control elements connected to said evaluating and control unit, said final control elements comprising at least one of a heating means with a fan and an air humidifier, said evaluating and control unit receiving measuring values of the skin temperature ($t_{h1}$, $t_{h2}$) at the patient and measuring values of the air temperature ($t_i$) measured in said incubator and setting the air temperature ($t_i$) in the incubator as a function of one of the core temperature ($t_c$) and the peripheral temperature ($t_p$) wherein the core temperature ($t_c$) is determined from the equation $t_c = t_{h1} + c' \cdot (t_{h1} - t_i)$ with c' being a constant, wherein the skin temperature ($t_{h1}$) is measured in a skin area at the head of the patient and the peripheral temperature ($t_p$) is determined from the equation $t_p = t_{h2} + c' \cdot (t_{h2} - t_i)$ with the constant c', wherein the skin temperature ($t_{h2}$) is measured in a skin area on the periphery of the patient.

10. A process for controlling the operating parameters of an incubator, the process comprising the steps of:
    determining a heat balance of a patient by measuring values of the skin temperature ($t_{h1}$, $t_{h2}$) at the patient and measuring values of the air temperature ($t_i$) measured in the incubator; and
    setting the air temperature ($t_i$) in the incubator as a function of one of the core temperature ($t_c$) and the peripheral temperature ($t_p$) wherein the core temperature ($t_c$) is determined from the equation $$t_c = t_{h1} + c' \cdot (t_{h1} - t_i)$$

with c' being a constant, wherein the skin temperature ($t_{h1}$) is measured in a skin area at the head.

11. The process in accordance with claim 10, wherein the skin temperature ($t_{h1}$) is measured at the forehead.

12. The process in accordance with claim 10, wherein the air temperature ($t_i$) in the incubator is set as a linear function of the difference tc–tp.

13. The process in accordance with claim 10, wherein the relative humidity in the incubator is set by means of an air humidifier as a function of the air temperature ($t_i$) in the incubator, the core temperature ($t_c$) and/or the peripheral temperature ($t_p$).

14. The process in accordance with claim 10, the air temperature ($t_i$) in the incubator is set by means of a heating means with a fan.

15. The process in accordance with claim 10, wherein the measured temperatures ($t_{h1}$, $t_{h2}$, $t_i$) are processed in a central evaluating and control unit and the control signals determined are subsequently sent to the final control elements determining the operating parameters of the incubator, especially to the heating means with a fan and/or to the air humidifier.

16. A process for controlling the operating parameters of an incubator, the process comprising the steps of:
    determining a heat balance of a patient by measuring values of the skin temperature ($t_{h2}$) at the patient and measuring values of the air temperature ($t_i$) measured in the incubator; and
    setting the air temperature ($t_i$) in the incubator as a function of the peripheral temperature ($t_p$) determined from the equation $$t_p = t_{h2} + c' \cdot (t_{h2} - t_i)$$

with the constant c', wherein the skin temperature ($t_{h2}$) is measured in a skin area on the periphery.

17. The process in accordance with claim 16 wherein the skin temperature (th2) measured at the extremities, especially at the foot.

* * * * *